United States Patent Office 3,222,410
Patented Dec. 7, 1965

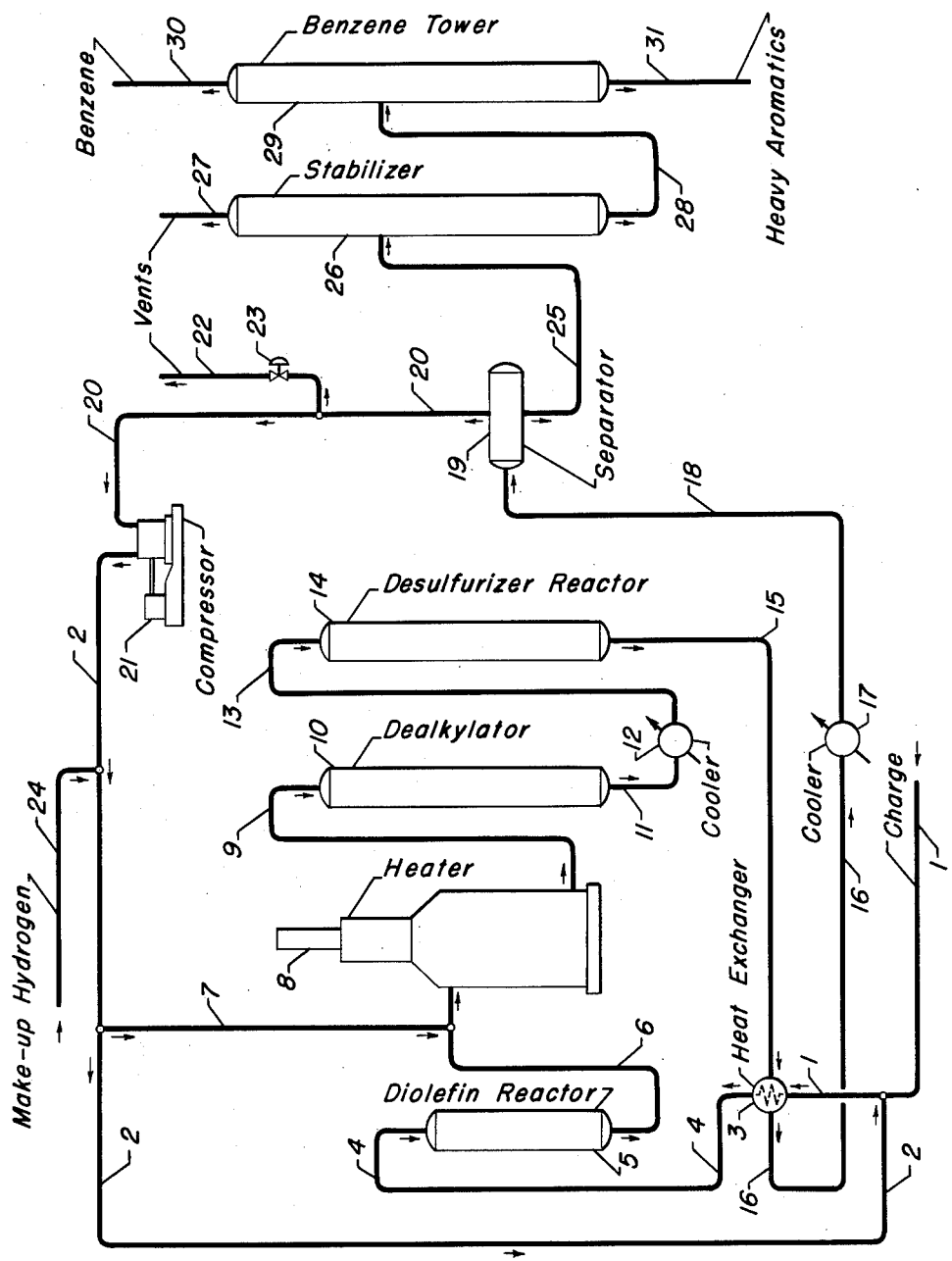

3,222,410
DEALKYLATION OF UNSATURATED SULFUR-CONTAINING ALKYLAROMATIC HYDROCARBONS
William M. Swanson, Arlington Heights, Ill., assignor to Universal Oil Products Company, Des Plaines, Ill., a corporation of Delaware
Filed Feb. 15, 1962, Ser. No. 173,573
15 Claims. (Cl. 260—672)

The invention described herein relates to a process for the conversion of alkylaromatic hydrocarbons such as toluene, isomeric aromatics having eight carbon atoms, methyl naphthalenes, mixtures thereof, etc. More specifically, the invention is directed toward a combination process for effecting the conversion of an unsaturated, sulfur-containing alkyl-aromatic hydrocarbon to produce an aromatic hydrocarbon. The utilization of the process of the present invention permits the conversion of alkylaromatic hydrocarbon charge stocks containing paraffinic, olefinic and di-olefinic hydrocarbons, in addition to one or more other contaminating influences such as sulfurous, nitrogenous and/or oxygenated compounds. The combinative hydrorefining-hydrodealkylation process of the present invention is conducted under particular conditions of operation, and in such a manner as will inhibit the formation of coke, and other polymerized carbonaceous material, which otherwise causes malfunctioning of the process equipment and the relatively rapid catalyst deactivation characteristic of a process for effecting the hydrodealkylation of such unsaturated, sulfur-contaminated alkylaromatic hydrocarbon charge stocks.

The process of hydrodealkylation of alkylaromatic hydrocarbons, and methylation of paraffinic hydrocarbons in the presence of hydrogen, to effect conversion thereof to aromatic hydrocarbons, and methane has recently achieved significant importance within the petroleum refining industry. Generally, the demand for greater quantities of high-purity aromatic hydrocarbons has increased, and the supply available from natural sources has not been sufficient to meet this demand. Aromatic hydrocarbons, such as benzene, naphthalene, etc., are adaptable to a wide variety of uses in the chemical field. For example, high-purity benzene is an important starting material in the manufacture of alkylaromatic sulfonates which are useful as detergents and surface active agents. These alkylaromatic sulfonates are prepared by alkylating benzene with a long chain polymer containing from about 12 to about 15 carbon atoms, or more; the polymer is initially prepared, for example, by effecting the polymerization of propylene. After the benzene has been alkylated with the long chain polymer, the resultant compound is sulfonated by any of the well-known, suitable methods of the prior art, to produce the corresponding sulfonic acid. These acids are subsequently neutralized by a suitable alkaline material such as sodium hydroxide, potassium hydroxide, etc. Benzene is also extensively utilized in the production of phenol, styrene, and as an intermediate in the preparation of many synthetic fibers. As a raw material, a wide demand for naphthalene is found in the production of phthalic anhydride. The benzene or naphthalene must have a high degree of purity, and must be necessarily substantially completely free from mono- and di-olefinic hydrocarbons, and sulfurous compounds. The combination process of the present invention yields substantially pure aromatic hydrocarbons from alkylated aromatics and mixtures thereof, permitting the utilization of unsaturated, sulfur, nitrogen and oxygen-contaminated charge stocks in a manner affording economical advantages heretofore not obtained.

The hydrocarbon charge stocks for utilization in the combination process of the present invention may be light cycle oil extracts, coke oven by-products, select fractions from coal tar crudes, the hydrocarbon distillate resulting from thermal cracking operation conducted primarily for the production of fuel gas for cities, etc. Generally, such hydrocarbon mixtures contain excessive quantities of impurities which must necessarily be removed before the mixtures are suitable for their intended use, and particularly as charge stocks to a process designed for the dealkylation of alkyl-aromatic hydrocarbons to produce high-purity aromatics. Included among these impurities are sulfurous compounds, nitrogeneous compounds, oxygenated compounds, and various metallic contaminants, all of which cause the hydrocarbon mixture to exhibit corrosive tendencies, and be foul smelling, whereby the same is unsuitable for efficient, subsequent processing.

The contaminating influence of sulfurous compounds, such as mercaptans, thiophenes, sulfates, etc., is often partially eliminated through the use of a suitable hydrodesulfurization process wherein the sulfur-bearing molecules are treated under conditions which effect the conversion thereof to hydrogen sulfide and a liquid hydrocarbon. The same treatment is generally effective in removing nitrogen-bearing molecules by converting them to a liquid hydrocarbon and ammonia, the latter either being removed in a vapor phase, or washed from the product effluent. However, in addition to the contaminating influence exhibited by sulfurous, nitrogenous and oxygenated compounds, the various hydrocarbon charge stocks, such as the by-product light oil from coke ovens, and light cycle oil extracts, contain an appreciable quantity of unsaturated hydrocarbons, both mono-olefinic and di-olefinic, as well as a significant proportion of paraffins, the former including compounds such as isoprene, dicyclopentadiene, etc. These unsaturated hydrocarbons impart the coke-forming, polymerization characteristics to the hydrocarbon mixture, and when, the latter is subjected to hydrodealkylation conditions, including temperatures of from about 1000° to about 1500° F., there frequently is encountered the difficulty of effecting the desired degree of dealkylation. Various heaters, and miscellaneous appurtenances of the conversion and preheating zone become solidly plugged through the formation of a highly carbonaceous material resulting from the reaction of the unstable, or coke-forming compounds within the hydrocarbon distillate. Similarly, when the hydrocarbon mixture is subjected to a hydrorefining process for the purpose of effecting the removal of sulfurous and nitrogenous compounds, the operating conditions are such that the mono-olefinic and di-olefinic hydrocarbons undergo polymerization and copolymerization, which reactions appear to be promoted by the presence of sulfurous compounds, the sulfur actually appearing in the polymerized product, thereby producing the heavy hydrocarbonaceous material.

The primary object of the present invention is to provide a combination process for the hydrorefining and dealkylation of an unsatruated, alkylaromatic hydrocarbon charge stock contaminated by the presence of sulfurous, oxygenated and/or nitrogenous compounds, in a manner which inhibits and avoids the excessive deposition of coke and other carbonaceous material within the attendant manifolding of the process and also onto the catalytic composite employed, while producing large yields of substantially pure aromatic hydrocarbons.

Therefore, in a broad embodiment, the present invention relates to a process for the conversion of an alkyl-aromatic hydrocarbon charge stock containing unsaturated hydrocarbons which comprises reacting said charge stock with hydrogen in a first reaction zone at conditions selected to hydrogenate at least a portion of said unsaturated hydrocarbons, further reacting the resulting effluent with hydrogen in a second reaction zone at hydrodealkylation conditions selected to convert said alkylaromatic hydrocarbon to an aromatic hydrocarbon.

In another embodiment, the present invention provides a process for the conversion of an alkylaromatic hydrocarbon charge stock containing unsaturated hydrocarbons which comprises reacting said charge stock with hydrogen in a first reaction zone at conditions selected to hydrogenate at least a portion of said unsaturated hydrocarbons, and including a temperature within the range of from about 300° F. to about 550° F.; reacting at least a portion of the resulting hydrogenated effluent with hydrogen in a second reaction zone maintained at a pressure within the range of from about 300 to about 1000 pounds per square inch gauge, a temperature within the range of from about 1000° F. to about 1500° F., and selected to convert said alkylaromatic hydrocarbon to an aromatic hydrocarbon.

A more limited embodiment of the present invention involves a process for the conversion of an unsaturated, sulfur-containing alkylaromatic hydrocarbon charge stock which comprises reacting said charge stock with hydrogen in a first reaction zone at hydrogenation conditions including a temperature less than about 550° F., reacting at least a portion of the resulting effluent with hydrogen in a second reaction zone at hydrodealkylation conditions including a temperature within the range of from about 1000° F. to about 1500° F. and selected to convert said alkylaromatic hydrocarbon to an aromatic hydrocarbon; further reacting the effluent from said second reaction zone with hydrogen in a third reaction zone at desulfurization conditions including a temperature greater than about 550° F., and recovering an aromatic hydrocarbon substantially free from unsaturated hydrocarbons and sulfur.

Another limited embodiment encompasses a process for the conversion of an unsaturated, sulfur-containing alkylaromatic hydrocarbon charge stock which comprises reacting said charge stock at hydrogenation conditions including a temperature within the range of from about 300° F. to about 550° F. and a pressure of from about 300 to about 1000 pounds per square inch gauge, in a first reaction zone containing a hydrogenation catalytic composite of molybdenum and at least one metallic component from the iron-group of the Periodic Table; reacting at least a portion of the resulting first reaction zone effluent with hydrogen in a second reaction zone at hydrodealkylation conditions including a temperature within the range of from about 1000° F. to about 1500° F., a pressure of from about 300 to about 1000 pounds per square inch gauge, and in contact with a dealkylation catalytic composite of chromia and alumina, said hydrodealkylation conditions selected to convert said alkylaromatic hydrocarbon to an aromatic hydrocarbon; further reacting the effluent from said second reaction zone with hydrogen in a third reaction zone containing a desulfurization catalyst consisting of molybdenum and at least one metallic component from the iron-group of the Periodic Table, at desulfurization conditions including a temperature within the range of from about 550° F. to about 800° F. and a pressure within the range of from about 300 to about 1000 pounds per square inch gauge, and recovering an aromatic hydrocarbon substantially free from unsaturated hydrocarbons and sulfur.

From the foregoing embodiments, it will be readily ascertained that the present invention involves the multiple-stage processing of an alkylaromatic hydrocarbon charge stock, such as toluene, methyl naphthalene, etc., containing unsaturated hydrocarbons and contaminated by the presence of sulfurous and/or nitrogenous compounds, to produce a high-purity aromatic hydrocarbon such as benzene, naphthalene, etc. Through the utilization of a particular sequence of the processing steps, involving a plurality of reaction zones, the formation of high molecular weight polymers and copolymers, indicated by the deposition of coke and other carbonaceous material is inhibited to a degree which permits a substantial extension of the period of time during which the process performs its intended function. The particular sequence of processing steps, hereinafter set forth in greater detail, is such that the unsaturated, sulfur-contaminated alkylaromatic charge stock is not processed at those conditions which normally selectively promote the undesirable polymerization and/or copolymerization reactions, and, more significantly, do not result in an excessive degree of aromatic ring saturation.

The preferred method of carrying out the combination process of the present invention utilizes a sequence of contacting or reaction zones, each of which exists at operating conditions consistent with the chemical characteristics of the hydrocarbon mixture passing therethrough, and the desired object to be achieved therein. Another method would be to react the hydrocarbon mixture and hydrogen continuously in a single reaction zone having suitable internal heat-exchange facilities, whereby the temperature is adjusted as the hydrocarbon distillate passes through the various beds of catalyst disposed within the reaction zone. In those instances where an extreme degree of unsaturation may result in too great a temperature rise in a single reaction zone, due to the exothermicity of the reaction, it may be desirable to provide multiple-point introduction of the charge stock at various intermediate sections of such reaction zone, or dilution of the charge stock by recycling at least a portion of the normally liquid product effluent. This tends to prevent a high degree of saturation from occurring in one particular portion of the catalyst, and also provides cooling of the charge stream as it passes through the reaction zone. Internal quench streams may be employed when excessive temperature rise is an aspect to be considered. The particularly preferred method of conducting the process of the present invention, especially in large scale commercial installations, is to utilize individual reaction zones having adequate heat-exchange facilities therebetween.

The process of the present invention, and the method for effecting the same, may be understood more clearly upon reference to the accompanying drawing which schematically illustrates one possible flow. It is understood that the drawing, as well as the description thereof, is presented herein for the sole purpose of illustration, and is not intended to limit the process of the present invention beyond the scope and spirit of the appended claims. In the interest of simplicity, various heaters, condensers, valves, controls, instruments, etc., have been eliminated from the drawing; only those vessels and connecting lines necessary for the complete understanding of the process are indicated. In describing the drawing, the hydrocarbon charge stock being processed will be assumed to be a light oil byproduct from a coke oven operation. A typical product of this nature contains sulfurous compounds of the order of about 0.4 wt. percent, calculated as elemental sulfur, total nitrogen in an amount of about 0.25 wt. percent, mono-olefinic hydrocarbons in an amount to indicate a bromine number of about 20, and di-olefinic hydrocarbons in an amount which indicates a diene value of about 2.0 to about 5.0 or more. The hydrocarbon charge stock, containing about 65.0% by volume of benzene, about 19.0% by volume of toluene, approximately 10.0% by volume of $C_8$-aromatic isomers, and about 2.5% by volume of paraffinic and naphthenic hydrocarbons, enters the process through line 1, being admixed therein with a hydrogen-rich recycle gas stream from line 2, the mixture passing through heat-exchanger 3 and line 4 into diolefin reactor 5. Heat-exchanger 3 is operated in a manner such that the temperature at the inlet to the bed of catalyst within the reaction zone is above about 300° F., and at a level such that the heat of reaction, due to the exothermicity of the hydrogenation reactions, does not result in a product effluent having a temperature greater than about 550° F. Therefore, the temperature of the material entering diolefin reactor 5 is preferably within the range of about 400° F. to about 450° F. Diolefin reactor 5 is maintained under an imposed pressure within the range of about 300 to about 1000 pounds per square inch, and at these conditions, and in the presence of hydrogen, the di-olefinic hydrocarbons are at least partially hydrogenated to form paraffinic hydrocarbons and/or additional mono-olefinic hydrocarbons, at least a portion of which are hydrogenated to form additional paraffins. In this manner, and at temperatures less than about 550° F., very little polymerization and/or copolymerization is effected. The catalyst disposed within reaction zone 5, hereinafter described in greater detail, is of a composition and character that, under the foregoing operating conditions, very little, if any, aromatic ring saturation or opening takes place.

The product effluent from reaction zone 5 passes through line 6, being admixed with additional hydrogen in line 7, where required. Under certain conditions of operation, and when processing a particular charge stock, it may not be necessary to add fresh hydrogen to the effluent of reaction zone 5. The mixture passes through heater 8 and line 9 into dealkylation reactor 10. Dealkylation reactor 10 is maintained under an imposed pressure within the range of about 300 to about 1000 pounds per square inch gauge, although at a slightly lower level than that of reaction zone 5 in order to compensate for the pressure drop experienced in passing the first zone effluent through the attendant manifolding into reaction zone 10. The inlet temperature to reaction zone 10 is such that the catalyst bed temperature is within the range of about 1000° F. to about 1500° F.; the mixture passing through heater 8 is raised to a temperature level preferably within the range of about 1100° F. to about 1300° F.

The product effluent from reaction zone 10 passes through line 11 into cooler 12 wherein the temperature thereof is decreased to a level such that the inlet catalyst temperature within desulfurization reactor 14 is above about 550° F., and the temperature of the product effluent does not exceed about 800° F. The thus cooled effluent passes through line 13 into reactor 14, the latter being maintained at a pressure within the range of about 300 to about 1000 pounds per square inch gauge, and at a level slightly below that maintained on reaction zone 10. At these conditions, the sulfurous compounds are converted into hydrocarbons and hydrogen sulphide, the nitrogenous compounds into hydrocarbons and ammonia, and any remaining mono-olefinic hydrocarbons are saturated. The total product effluent from reaction zone 14 passes through line 15 into heat-exchanger 3, wherein it is utilized to raise the temperature of the fresh hydrocarbon charge stock to the level desired in reaction zone 5. The third reaction zone effluent then passes through line 16, cooler 17 and line 18 into separator 19. Separator 19 is operated at essentially the same pressure imposed upon the various reaction zones within the process. Separator 19, operating at about room temperature or slightly above, serves the purpose of removing hydrogen sulfide, ammonia, and various gaseous hydrocarbons, including methane, ethane, propane, butane, etc., through line 20. At least a portion of this gaseous phase is continually withdrawn through line 22 containing pressure control valve 23. The remainder of the gaseous phase passes through compressor 21 wherein it is raised to the desired operating pressure, passing through line 2, being ultimately admixed with the fresh hydrocarbon charge in line 1. Make-up hydrogen, as required, is introduced through line 24, and can enter the process at any convenient point. The normally liquid hydrocarbons are withdrawn from separator 19 via line 25, and pass into stabilizer 26 wherein hydrocarbons lighter than benzene are fractionated overhead and removed through line 27. The stabilizer bottoms stream passes through line 28 into benzene tower 29 wherein about 80.0% by volume of benzene, based upon the charge stock, is removed via line 30, the heavier aromatic hydrocarbons, including naphthalene, and unreacted toluene removed via line 31. Where desired, the heavy aromatics in line 31 may be subjected to fractionation and at least in part recycled to combine with the fresh hydrocarbon charge in line 1 or the charge to dealkylation reaction zone 10.

Various modifications of the illustrated embodiment may be made by those possessing skill within the art of petroleum processing, and having particular knowledge of hydrorefining and hydrodealkylation process schemes and techniques. It is not intended that such modifications shall remove the resulting process flow from the broad scope and spirit of the appended claims. To illustrate, separation zone 19 is generally combined with additional separating and/or adsorbing means, whereby a somewhat different flow pattern and apparatus set up results. Water injection may be provided in line 18, for the purpose of absorbing the ammonia therein, the water and absorbed ammonia being removed by suitable liquid-level control means from separator 19. Similarly, the gaseous phase being removed from separator 19 in line 20 may be passed into a suitable sorption column wherein hydrogen sulfide is readily removed prior to passing the gaseous phase into compressor 21. The light paraffinic hydrocarbons in the gaseous phase may also be removed by sorption, stripping, etc. Various other modifications will be readily recognized by those possessing skill within the art; however, as hereinabove stated, it is not intended to limit unduly the process of the present invention to such modifications.

The fresh hydrocarbon charge stock, entering reaction zone 5 will be in an amount to result in a liquid hourly space velocity (defined as volumes of hydrocarbon charge per volume of catalyst disposed within the reaction zone) within the range of from about 0.5 to about 10.0. The quantity of hydrogen-rich recycle gas, and added hydrogen through line 24 being admixed therewith will be such that the hydrogen entering reaction zone 5 is in an amount above about 500 standard cubic feet per barrel of total hydrocarbon charge, having an upper limit of about 10,000. The preferred range is from about 500 to about 6000. The quantity of recycled hydrogen passing through line 7, ultimately entering dealkylation zone 10, is such that the gaseous phase of the product effluent therefrom comprises at least about 60.0 mol percent hydrogen.

As hereinabove set forth, the operating conditions imposed upon diolefin reactor 5 are such that at least partial hydrogenation of the di-olefins and mono-olefins is effected without the attendant polymerization and/or copolymerization thereof, and further, without the attendant saturation of the aromatic nuclei. To serve this function, the catalytic composite disposed within diolefin reactor 5 comprises at least one metallic component selected from the group consisting of the metals from Groups VI–B and VIII of the Periodic Table. Thus, the catalytic composite will comprise at least one metallic component from the group of chromium, molybdenum, tungsten, iron, cobalt, nickel, ruthenium, rhodium, palladium, osmium, iridium, platinum, and mixtures of two or more, etc. A suitable catalytic composite, for utilization in the diolefin reactor 5 comprises molybdenum and at least one metallic component selected from the iron-group of the Periodic Table. The molybdenum component will generally be in the greater concentration and within the range of from about 4.0% to about 30.0% by weight, while the iron-group metallic component, or components, will be present in an amount of from about 1.0% to about 6.0% by weight, such concentrations being calculated on the basis of the elemental metal. Another catalytic composite comprises from about 0.1% to about 10.0% by weight of platinum. It is preferred that the catalytically active metallic components, selected from Groups VI–B and VIII of the Periodic Table, be composited with a non-acidic carrier material. Generally, catalytically active metallic components are combined with any suitable refractory inorganic oxide material including alumina, silica, zirconia, thoria, boria, titania, hafnia, and mixtures of two or more, etc. Similarly, other components are often utilized in conjunction with the metallic components and the carrier material; these include the members of the halogen family, particularly fluorine and/or chlorine. However, these components, as well as some of the various refractory inorganic oxides above set forth, impart a particularly desired acid-acting function to the catalytic composite, which function is not conducive to effecting the process of the present invention. For example, a carrier material comprising a given combination of alumina and silica will possess sufficient hydrocracking activity to affect detrimentally the attainment of the object of the present invention. Therefore, a particularly preferred carrier material, for utilization in manufacturing the catalyst employed in diolefin reactor 5, comprises alumina. Although any suitable means may be employed for the manufacture of the catalytic composite, for example containing about 1.8% by weight of nickel and about 16.0% by weight of molybdenum, calculated as the elemental metal, an especially convenient means involves the utilization of impregnating techniques on a preformed alumina carrier material. It is understood, however, that the precise method utilized for the manufacture of the catalytic composite is not considered to be a limiting feature of the present invention.

The substantially hydrogenated charge stock, which may include alkylaromatics such as toluene, meta-xylene, ortho-xylene, para-xylene, ethylbenzene, ortho-diethylbenzene, meta - diethylbenzene, para - diethylbenzene, methyl naphthalene, dimethyl naphthalene, etc., in addition to sulfur-contaminated benzene, is charged to the hydrodealkylation zone having disposed therein a catalyst containing, for example, a noble metal of Group VIII of the Periodic Table, including platinum, palladium, rhodium, ruthenium, osmium, iridium, etc., composited with a suitable refractory inorganic oxide, etc.; other metallic components such as cesium, vanadium, chromium, tungsten, etc.; or combinations of the latter class with themselves or with the foregoing noble metals of Group VIII, and generally composited with a refractory inorganic oxide such as alumina, silicia, zirconia, silica-alumina, aluminaboria, silica-zirconio-alumina, etc. The alkylaromatic hydrocarbon is then hydrodealkylated, in the presence of hydrogen, at temperatures ranging from about 1000° F. to about 1500° F., and preferably within the range of about 1100° F. to about 1300° F. Dealkylator reaction zone 10 is maintained under an imposed pressure within the range of from about 300 to about 1000 pounds per square inch, and more preferably at a pressure within the range of from about 500 to about 600 pounds per square inch. The quantity of hydrodealkylation catalyst disposed in reaction zone 10 is such that the liquid hourly space velocity is from about 0.5 to about 10.0.

The total effluent from the hydrodealkylation reaction zone is passed through a cooler, or other suitable heat-exchange means, for the purpose of decreasing the temperature thereof to a level not below about 550° F. That is to say, the inlet temperature to the desulfurization catalyst disposed within the third reaction zone is at least about 550° F., and preferably at such a temperature that the exothermic heat of reaction experienced in passing dehydroalkylated hydrocarbon thruogh such catalyst does not cause the temperature of the total reaction zone effluent to increase to a level above about 800° F.

The catalyst disposed within desulfurization reaction zone 14 may be of the same composition as that which is disposed in diolefin hydrogenation reaction zone 5. On the other hand, depending upon the varying qualities of sulfurous compounds, it may be desirable to vary the composition of such catalyst for the purpose of effecting more optimum desulfurization. The quantity of catalyst utilized for desulfurization is such that the liquid hourly space velocity therethrough lies within the range of from about 0.5 to about 10.0.

From the foregoing description of the accompanying drawing, it is seen that the present invention involves primarily three reactions; these are, hydrogenation of mono-olefinic and di-olefinic hydrocarbons, desulfurization of sulfur-bearing hydrocarbon molecules, and the hydrodealkylation of alkylaromatic hydrocarbons. It is further ascertained that the process of the present invention involves initially hydrogenating the di-olefinic hydrocarbons and at least a portion of the mono-olefinic hydrocarbons, followed by the hydrodealkylation of the alkylaromatic hydrocarbons, and lastly the desulfurization of the sulfur-bearing hydrocarbon molecules. Among the many advantages afforded through the utilization of this combination process is a lower investment cost: at least one fractionator, a recycle gas compressor, at least one high-pressure product separator, a substantially large heater, condensers and intermediate storage facilities are eliminated not to mention the miscellaneous appurtenances hereof. To illustrate, in those processes wherein the alkylaromatic hydrocarbon charge stock is initially hydrogenated and desulfurized, an exceptionally large heater is required to raise the temperature of the hydrorefined product effluent to the level necessary for effecting proper hydrodealkylation, in addition to the heater required in raising the temperature of the hydrogenated product effluent to that level required for the effective desulfurization thereof. In conjunction with the foregoing lower investment cost, a lower operating cost is experienced, and is reflected primarily in manpower and utility costs of the hydrorefining portion of the operation. In those processes wherein the hydrocarbon charge stock is desulfurized and hydrogenated prior to effecting the hydrodealkylation thereof, the product effluent from the desulfurizer reaction zone must necessarily be subjected to an additional gas-liquid separation coupled with a pretreatment of the gaseous phase in order to increase the hydrogen purity thereof. This is required since acceptable hydrodealkylation operating conditions include a minimum hydrogen content within the effluent gas of about 60.0 mol perent. In accordance with the present invention, in which the hydrodealkylation is effected prior to desulfurization, the quantity of hydrogen normally necessary to effect the hydrodealkylation, desulfurization, and other reaction when accomplished in two separate units, is decreased by the amount required to convert the sulfurous compounds into a hydrocarbon and hydrogen sulfide, the organic nitrogen compounds into a hydrocarbon and ammonia, and by the solution and compressor losses that would have been present in a separate hydrodesulfurization unit.

*Example*

The example described herein is given for the purpose of illustrating the advantages afforded the process of hydrodealkylating a coke oven by-product wash oil containing about 15.0% by weight of naphthalene, about 35.0% by weight of methyl naphthalene, and other alkylaromatic hydrocarbons. In addition, the wash oil contains sulfurous compounds in an amount of about 0.45% by weight, computed as elemental sulfur, about 8000 p.p.m. of nitrogenous compounds, indicates a bromine number of about 17.0 and contains sufficient di-olefinic hydrocarbons to possess a diene value of about 3.5. It is understood that the scope of the present invention is neither limited to a charge stock of this character, nor to the operating conditions hereinafter set forth.

This charge stock is admixed with a gaseous recycle stream containing hydrogen in an amount of about 3000 standard cubic feet per barrel of liquid hydrocarbon charge, the mixture being heated to a temperature of 400° F. At a liquid hourly space velocity of 3.0, the mixture is introduced into a reaction zone maintained under an imposed pressure of 600 pounds per square inch gauge, and containing a hydrogenation catalytic composite of alumina, 1.8% by weight of nickel and 16.0% by weight of molybdenum, calculated as the elements thereof. The liquid portion of the total product effluent from this hydrogenation reaction zone possesses a diene value less than about 1.0 indicating virtually complete saturation of the original di-olefinic hydrocarbons.

The substantially hydrogenated product effluent is raised to a temperature level of about 1150° F., and is passed into a reaction zone maintained under a pressure slightly below 600 pounds per square inch gauge, and containing a catalyst of alumina and chromia, the latter in an amount of about 15.0% by weight, calculated as chromium. The total product effluent from the hydrodealkylation reaction zone is passed through a suitable heat-exchange apparatus to decrease the temperature level thereof to about 700–800° F. The cooled effluent is passed into a desulfurization reaction zone containing a catalyst consisting essentially of 0.750% by weight of platinum composited with about 0.90% by weight of chlorine, and utilizing a carrier material of alumina.

The total product effluent from the desulfurization reaction zone is cooled to a temperature level of about 100° F. and passed into a high-pressure separator from which the normally liquid hydrocarbons are removed to a stabilizing column. The normally gaseous phase, containing hydrogen, ammonia, methane, ethane, propane, hydrogen sulfide, etc. is subjected to a stripping-sorption process for the purpose of removing the light paraffinic hydrocarbons, hydrogen sulfide and ammonia to a level such that the hydrogen concentration of the gaseous phase, which is recycled to combine with the fresh hydrocarbon charge, is at least about 60.0 mol percent.

The stabilizing column, into which the normally liquid, desulfurized product effluent is passed, is operated under conditions of temperature and pressure such that an overhead stream consisting essentially of straight-chain hydrocarbons containing less than 6 carbon atoms per molecule is removed as an overhead by-product. The remaining hydrocarbon, containing benzene, naphthalene and heavier hydrocarbons, and unreacted methylnaphthalene, dimethylnaphthalene, etc., is passed into a suitable fractionating column from which the benzene is removed as an overhead product, the naphthalene being recovered as a side-cut stream, or in a subsequent fractionating column. Based upon the fresh hydrocarbon charge, benzene is recovered in an amount of about 10.0% by weight, and naphthalene is an amount of about 60.0% by weight.

The foregoing example and specification indicate the method by which the process of the present invention is conducted, as well as the benefits to be afforded through the utilization thereof.

I claim as my invention:

1. A process for the conversion of an alkylaromatic hydrocarbon charge stock containing mono-olefinic and di-olefinic hydrocarbons which comprises reacting said charge stock with hydrogen in a first reaction zone at conditions selected to hydrogenate at least a portion of said mono-olefinic and di-olefinic hydrocarbons, and including a temperature within the range of from about 300° F. to about 550° F.; reacting at least a portion of the resulting hydrogenated effluent with hydrogen in a second reaction zone at a temperature within the range of from about 1000° F. to about 1500° F., and selected to dealkylate alkylaromatic hydrocarbon in said charge stock.

2. A process for the conversion of an alkylaromatic hydrocarbon charge stock containing mono-olefinic and di-olefinic hydrocarbons which comprises reacting said charge stock with hydrogen in a first reaction zone maintained under a pressure of from about 300 to about 1000 pounds per square inch gauge, and having disposed therein a hydrogenation catalyst comprising of at least one metallic component selected from the metals of Groups VI–B and VIII of the Periodic Table, at a temperature within the range of from about 300° F. to about 550° F.; reacting at least a portion of the resulting first reaction zone effluent with hydrogen in a second reaction zone maintained at a pressure of from about 300 to about 1000 pounds per square inch gauge, and containing a dealkylation catalyst maintained at a temperature within the range of from about 1000° F. to about 1500° F., and selected to dealkylate the alkylaromatic hydrocarbon in said charge stock.

3. The process of claim 2 further characterized in that said dealkylation catalyst comprises chromia and alumina.

4. The process of claim 2 further characterized in that said hydrogenation catalyst comprises molybdenum and at least one metallic component from the iron-group of the Periodic Table.

5. A process for the conversion of an olefinic, sulfur-containing alkylaromatic hydrocarbon charge stock which comprises reacting said charge stock with hydrogen in a first reaction zone at hydrogenation conditions including a temperature less than about 550° F., reacting at least a portion of the resulting effluent with hydrogen in a second reaction zone at hydrodealkylation conditions including a temperature within the range of from about 1000° F. to about 1500° F. and selected to dealkylate the alkylaromatic hydrocarbons in said charge stock; further reacting the effluent from said second reaction zone with hydrogen in a third reaction zone at desulfurization conditions including a temperature greater than about 550° F., and recovering an aromatic hydrocarbon substantially free from olefinic hydrocarbons and sulfur.

6. The process of claim 5 further characterized in that said charge stock is reacted with hydrogen in the first reaction zone at a temperature within the range of from about 300° F. to about 550° F.

7. The process of claim 5 further characterized in that the effluent from said second reaction zone is further reacted with hydrogen at a temperature within the range of from about 550° F. to about 800° F.

8. A process for the conversion of an olefinic, sulfur-containing alkylaromatic hydrocarbon charge stock which comprises initially reacting said charge stock at hydrogenation conditions including a temperature of from about 300° F. to about 550° F., in a first reaction zone containing a hydrogenation catalyst, and maintained at a pressure within the range of from about 300 to about 1000 pounds per square inch gauge; reacting at least a portion of the resulting effluent with hydrogen in a second reaction zone at hydrodealkylation conditions including a temperature within the range of from about 1000° F. to about 1500° F., a pressure within the range of from about 300 to 100 pounds per square inch gauge and in contact with a dealkylation catalyst; further reacting the effluent from said second reaction zone with hydrogen in a third reaction zone containing a desulfurization catalyst and maintained under a pressure of from about 300 to about 1000 pounds per square inch gauge, and at a temperature within the range of from about 550° F. to about 800° F., and recovering an aromatic hydrocarbon substantially free from olefinic hydrocarbons and sulfur.

9. The process of claim 8 further characterized in that said hydrogenation catalyst comprises at least one metallic component selected from the metals of Groups VI–B and VIII of the Periodic Table.

10. The process of claim 8 further characterized in that said dealkylation catalyst comprises chromia and alumina.

11. The process of claim 8 further characterized in that said desulfurization catalyst comprises at least one metallic component selected from the metals of Groups VI–B and VIII of the Periodic Table.

12. A process for the conversion of an olefinic, sulfur-containing alkylaromatic hydrocarbon charge stock which comprises reacting said charge stock at hydrogenation conditions including a temperature within the range of from about 300° F. to about 550° F. and a pressure of from about 300 to about 1000 pounds per square inch gauge, in a first reaction zone containing a hydrogenation catalyst comprising molybdenum and at least one metallic component from the iron-group of the Periodic Table; reacting at least a portion of the resulting first reaction zone effluent with hydrogen in a second reaction zone at hydrodealkylation conditions including a temperature within the range of from about 1000° F. to about 1500° F., a pressure of from about 300 to about 1000 pounds per square inch gauge, and in contact with a dealkylation catalytic composite of chromia and alumina, said hydrodealkylation conditions selected to dealkylate the alkylaromatic hydrocarbon in said charge stock; further reacting the effluent from said second reaction zone with hydrogen in a third reaction zone containing a desulfurization catalyst comprising a molybdenum and at least one metallic component from the iron-group of the Periodic Table, at desulfurization conditions including a temperature within the range of from about 550° F. to about 800° F. and a pressure within the range of from about 300 to about 1000 pounds per square inch gauge, and recovering an aromatic hydrocarbon substantially free from olefinic hydrocarbons and sulfur.

13. The process of claim 12 further characterized in that said alkylaromatic hydrocarbon charge stock comprises toluene.

14. The process of claim 12 further characterized in that said alkylaromatic hydrocarbon charge stock comprises methylnaphthalene.

15. The process of claim 12 further characterized in that said hydrogenation catalyst comprises molybdenum and nickel.

References Cited by the Examiner
UNITED STATES PATENTS

| | | | |
|---|---|---|---|
| 2,577,788 | 12/1951 | McAteer et al. | 260—672 |
| 2,774,719 | 12/1956 | Johanson | 208—216 |
| 2,883,441 | 4/1959 | Sawyer | 260—672 |
| 2,958,643 | 11/1960 | Friedman | 260—672 |
| 3,001,932 | 9/1961 | Pietsch | 208—212 |
| 3,116,233 | 12/1963 | Douwes et al. | 208—217 |

ALPHONSO D. SULLIVAN, *Primary Examiner.*